Nov. 26, 1946.  H. RUSKIN  2,411,594
DRY SHAVER AND ELEMENT THEREOF
Original Filed Dec. 8, 1938
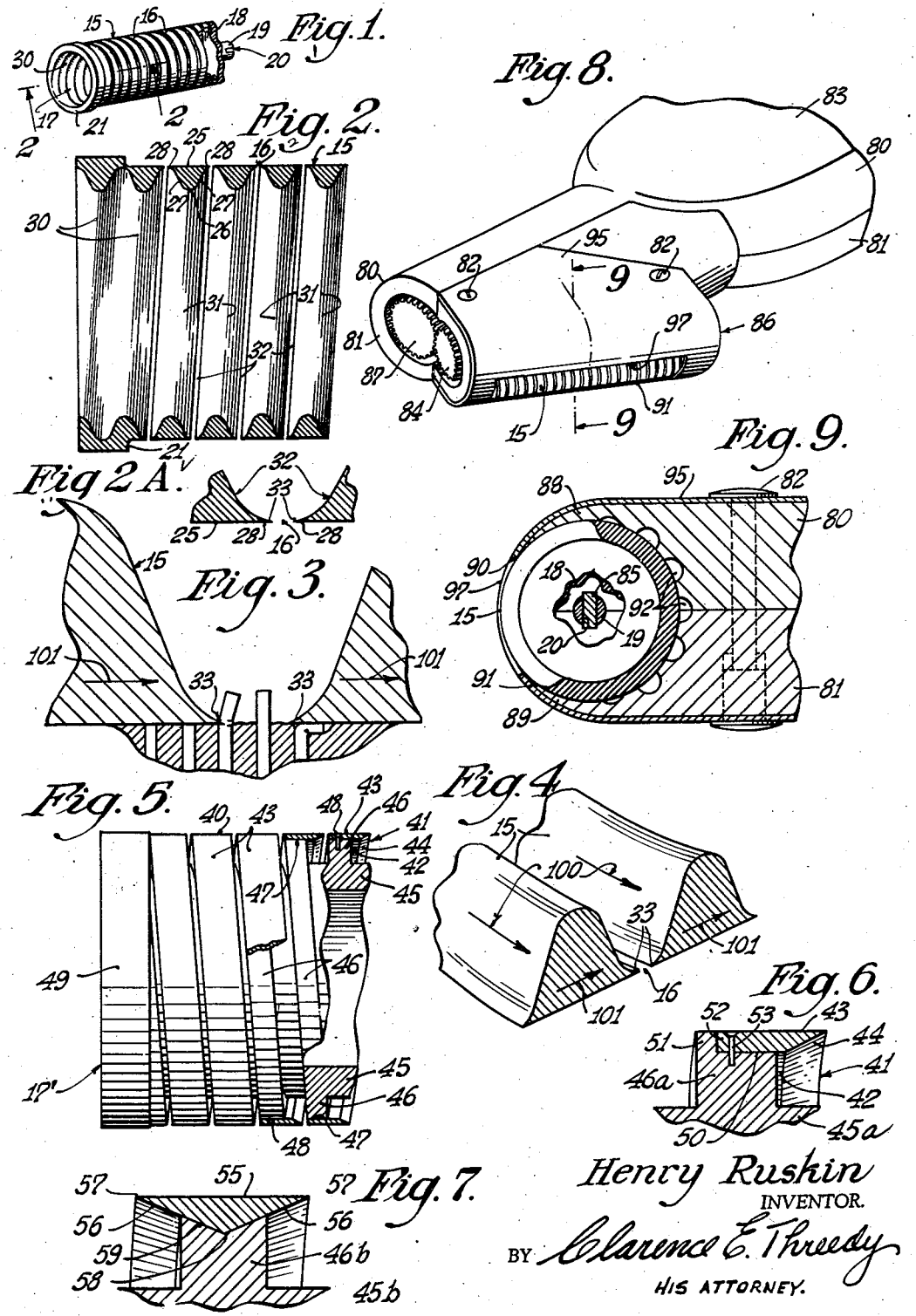
Henry Ruskin
INVENTOR.
BY Clarence E. Threedy
HIS ATTORNEY.

Patented Nov. 26, 1946

2,411,594

UNITED STATES PATENT OFFICE 2,411,594

DRY SHAVER AND ELEMENT THEREOF

Henry Ruskin, Chicago, Ill., assignor of one-half to George E. Hale, Chicago, Ill.

Original application December 8, 1938, Serial No. 244,593, now Patent No. 2,281,250, dated April 28, 1942. Divided and this application March 23, 1942, Serial No. 435,854

1 Claim. (Cl. 30—42)

This invention pertains broadly to dry-shaving devices and more particularly to a spiral cutter therefor, and to a means for driving a spiral cutter.

A particular object of the invention is the provision of a spiral cutter in the form of a helix of steel ribbon, the outer peripheral surface portion of which is of greater width laterally across the ribbon than the inner peripheral surface thereof so as to form sharp cutting edges along the juncture of the outer peripheral surface of the ribbon with the remaining body portions thereof.

A further and highly important object is the provision of a helical cutting member which may be employed without any guard and be placed directly against the skin to effect its shaving operations, the helical cutter being rotated by a suitable motor means and being characterized not only by its simplicity but also by its efficiency in cutting operation, the device being capable of unusually close shaving.

Another object is the provision in a dry-shave device of a movable cutting member which may be placed directly against the skin in effecting its cutting operation, due to certain peculiarities in the form and construction of the cutting elements.

Another object is the provision of a method of making a cutting helix in which a convolute steel ribbon is formed so as to have a somewhat triangular or trapezoidal cross section with the outer lateral surface of the ribbon sloping inwardly in a convergent manner so as to leave sharp edges along the juncture of the outer peripheral surface with the sloping body portions.

Yet another object is the provision of a cutter having pitched teeth or slots of particular contour.

A further object is the provision of a helical cutter, and method of making the same, in which there is a steel helix the convolutions of which are wider on their outer peripheral surface, transversely of the length thereof, than at their inner peripheral surface, the helix being of a unitary structure and having integral mounting means, or the helix being of a composite structure in which the helix is mounted on a mandrel.

Other novel aspects and objects of the invention reside in details of the construction, operation, form, and location of the parts of the device of the illustrative embodiment, as well as in the various steps of the method of making said device, all of which is described hereinafter in conjunction with the annexed drawing, in which:

Fig. 1 is a perspective view of a cutting helix;

Fig. 2 is an enlarged fragmentary median section along line 2—2 of Fig. 1;

Fig. 2—A is a magnified sectional fragment of the helical cutting edges shown in Fig. 2;

Fig. 3 is a magnified fragmentary section taken transversely through adjacent cutting turns of the helix to illustrate the cutting action thereof;

Fig. 4 is a fragmentary perspective of adjacent turns of the cutting helix illustrating the complex motion thereof; while Fig. 5 illustrates a modified spiral cutter and method of making the same, wherein the helix is mounted on a mandrel to provide a composite cutter with a single cutting edge;

Fig. 6 is a magnified sectional fragment of the ribbon and method of mounting the same on its mandrel;

Fig. 7 is a modified form of composite helical cutter in which the cutting helix is double-edged;

Fig. 8 is an enlarged fragmentary perspective of a shaving device employing the helical cutter;

Fig. 9 is an enlarged fragmentary vertical section through the shaving head and cutter, as seen along line 9—9 of Fig. 8.

This application constitutes a division of my invention shown and described in my copending application, S. N. 244,593, filed December 8, 1938, Patent No. 2,281,250.

The invention of this application provides a new form of spiral cutter and a means for making the same which, due to inherent structural and functional characteristics to be brought out hereinafter, may be used in direct contact with the skin of the shaver without any guard whatever.

By employing the method disclosed herein, it is possible to make helical cutters in which the turns of the helix are placed any desired distance apart so that cutting helices may be made variously for use in dry shaving devices and critical spacing between the turns controlled with a very high degree of accuracy. Moreover, the method makes possible the provision of extremely sharp cutting edges extending along the margins of the turns of the helix, the outer surfaces of the cutter nevertheless being flat so that they may safely bear against the skin of the shaver without the slightest danger of injury. Due to the fact that the spacing between the turns of the cutting helix is absolutely under control, such spacing may be held to a dimension which will preclude the possibility of skin entering between the turns of the helix where it could be cut or torn, the spacing nevertheless admitting hairs of a predetermined range of length and thickness between the turns.

In one of its forms, as illustrated in Fig. 1, the spiral cutter includes a helix 15 of steel "ribbon" or stock in which the convolutions are spaced from each other a predetermined amount as at 16 (Fig. 2 also), and in which one end 17 is left open while the opposite end is provided with an integral end plate 18 from which projects a stud shaft 19 having a slot 20, the stud shaft being mounted in a suitable bearing member to support the helix in cutting position, and a suitable drive means being connected to rotate the helix through the agency of the slot 20. It should be observed that the axial extremity of the helix adjacent its open end 17 is enlarged to provide a collar 21, the latter serving to support the helix in proper cutting position in cooperation with its stationary shear.

An important peculiarity of the cutting helix is the cross sectional shape of the ribbon forming its convolutions, this cross sectional shape being particularly illustrated in Fig. 2 wherein it will be observed that the outer peripheral surface 25 of the ribbon is wider in a direction laterally across the same than the inner peripheral surface 26 thereof whereby the intervening side wall or body portions 27 tend to converge in the surface 26 so that the junctures 28 between the outer peripheral surface and the remaining body portions, for example, the sloping sides 27, provides a sharp cutting edge along the opposite outer peripheral edges of the ribbon or convolutions of the helix. It is to be understood that the term "ribbon" as used herein is intended to apply both to a relatively flat and narrow length of stock such as shown, for example, in Fig. 5, and to the relatively thick stock shown in Fig. 2, except as may be otherwise specifically provided hereinafter.

As a result of the foregoing cross sectional shape of the ribbon or filamentary stock from which the spiral or helix is wound or formed, the cutting edges 28 are self-sharpening in those arrangements wherein the cutting helix is employed with a stationary shear against which the outer peripheral portions of the helix bear during rotation.

Another important feature of the invention is the method provided for making a cutting helix such as shown in Fig. 1. In this method, a rod of steel, preferably cylindrical in shape, is drilled from one end, which corresponds to the open end 17 of the helix 15, to a depth substantially equivalent to the desired depth of the helix, the bore terminating at the end plate or wall 18, and at a suitable stage in the procedure the stock is turned down to form a stud shaft 19 which is integral with the plate 18. When the bore has been completed, the resulting tubular stock is threaded internally so as to provide the threads 30 (Fig. 2), the crest or ridge portions 31 of which may be of any degree of sharpness ranging from a relatively flat land such as is shown in my aforementioned copending application, to a sharp ridge, the ridge portions 31 of the present threading being slightly rounded and constituting the inner peripheral surface of the convolutions of the spiral or helix. The intervening recessed portions or valleys 32 (Fig. 2—A also) between the ridge portions 31 of the threads are termed herein for purposes of convenience the troughs.

A tap suitable for use in threading the sleeve, and one which results in a thread having a contour and pitch especially suitable in the production of a cutting helix for use in a dry shaver, is one which is threaded with a Whitworth standard thread ⅜"—16.

After the sleeve form or bore has been tapped as aforesaid, the same is placed in a lathe or grinding machine, and the outer peripheral portions thereof are ground down so as to leave the collar 21 at one end thereof, the grinding or turning being continued to a depth sufficient to cut through the trough portions 32 between each internal thread and until the trough portions have been cut to a certain depth to provide the desired spacing 16 between the turns of the helix.

In the embodiment of Fig. 2, which illustrates the contour of thread resulting from the employment of a tap of the type mentioned, it will be observed that the slope of the side portions 27 of each thread decreases and tends to level off as these sides approach their junctures 28 with the outer peripheral surface 25 of the helix so that acutely sharp cutting edges 33 will result (Fig. 2—A).

The slope of the sides 27 may be made straight if it is desired to have the cutting edge wear down uniformly, although in this arrangement there is some sacrifice of initial sharpness, the cutting edges 33 shown in Fig. 2—A being extremely sharp in the first instance, so sharp, in fact, that the spiral has been used without any cooperating stationary shear or guard but placed directly against the skin, and the spiral cutting edges of themselves positively cut hair.

In the modified form of spiral cutter shown in Fig. 5, a steel ribbon 40 of relatively thinner stock than that which results in the ribbon convolutions of the spiral of Fig. 2, is ground along one of its inner edge portions to provide a cutting edge 41 which, as will be observed in the enlarged view of Fig. 6, slopes outwardly from the inner peripheral surface 42 of the ribbon to the outer peripheral surface 43 thereof, the pitch of the sloping side portion 44 which results from the grinding, however, being uniform, as distinguished from the curvilinear pitch shown in Fig. 2—A.

After grinding as aforesaid, the steel ribbon 40 is wound spirally upon a sleeve or tubular mandrel 45 on the outer peripheral portions of which have been provided threads 46 of square configuration and having particularly flat lands or tops 47 which engage the inner peripheral surfaces 42 of the helical ribbon, the helix being wound or tightly fitted over the mandrel and the threads 46 thereon, and the ribbon being secured to the mandrel by means such as pins 48 which are driven through the ribbon into the threads 46 at suitable intervals. A collar 49 may be sweated onto the endmost portions of the helix at the open end 17' thereof, while the opposite end of the mandrel 45 may be provided with an end plate and stud shaft, such as shown in Fig. 1.

In a modified arrangement of the ribbon spiral shown in Fig. 6, the mandrel 45a has its spiral threading or ridges 46a provided with an open-sided groove 50 along the top land at one side thereof so as to leave a spiral ridge 51, the inner peripheral surface portions 42 of the spiral ribbon being wound into the groove or track 50 with the unsharpened edge portion 52 thereof abutting the ridge 51, and pin means 53 being driven through the ribbon into the main ridge portion 46a. This latter arrangement provides a mounting for the cutting spiral which is exceedingly rigid and strong.

In still another modified arrangement of the sharpened steel ribbon, the ribbon 55 (Fig. 7) is sharpened along both edges from its inner periphery to provide convergently sloping sides 56 extending from the outer peripheral surface thereof so that opposite cutting edges 57 will result, the sloping sides converging in a ridge 58 which constitutes an inner peripheral portion of the spiral analogous to the inner peripheral ridge portions 31 of the arrangement of Fig. 2. In order to mount the cutting ribbon of Fig. 7, the mandrel 45b has its ridge portions 46b spaced somewhat farther apart with the top land portions thereof cut to provide a V-shaped seating groove 59 into which the convergent sides 56 of the ribbon fit firmly, the ribbon preferably being threaded onto the ridges 46b and gripping the latter tightly enough so that no other attaching means is necessary, an end collar analogous to the collar 17' of the arrangement of Fig. 5 likewise being applied to this latter form of helix and serving to prevent the ribbon from working off the mandrel.

One arrangement for employing the helical cutter of Fig. 1 in a shaving device, is illustrated in Figs. 8 and 9 wherein the cutter 15 is mounted for rotation between a pair of separable casing members 80 and 81 secured together by means such as the bolt 82, so that the cutter is disposed at an angle to the handle portion 83 of the remainder of the casing, as illustrated in Fig. 8, whereby the cutter may be conveniently manipulated relative to the shaving surface. A driven gear 84 is drivingly engaged with the slotted end portion 20, as seen in Fig. 9, wherein a lug 85 on the gear 84 is disposed in the slot 20 on the stud shaft 19 of a cutter made in accordance with the arrangement of Fig. 1. The opposite or free end of the helical cutter is exposed at the opposite end 86 of the head, and the collar portion 21 (not seen) rides on the inner peripheral portions of the casing members 80 and 81. The gear 84 is driven by another gear 87 having connection with an electric motor in the handle portion 83 of the casing.

The outer edge portions 88 and 89 of the separable members of the head are beveled so as to have horizontal marginal edges 90 and 91 disposed closely against or at the periphery of the cutting helix, these marginal edges defining a horizontal open slot through which a predetermined portion of the peripheral surface of the helix is exposed for direct contact with the face of the shaver. The inner surface portions of the separable casing head members are relieved by channeling 92 to reduce the friction of the helix in rotation.

A cover plate 95 is fitted around the shaving head and secured in place by bolts 82 with an elongated open slot 97 registered with the slot formed by the members 80 and 81 so that the predetermined peripheral surface portion of the cutting helix is exposed for direct contact with the face of the shaver.

In the cutting operation of the helix as employed in the arrangement of Fig. 8, it is pointed out that the turns of the helix have two degrees of movement in their cutting action, this being brought out in Fig. 4, wherein the tracer arrows 100 indicate the rotative motion of the turns, while the tracer arrows 101 indicate the translating or axially shifting cyclic motion of the turns.

Due to the extreme sharpness imparted to the cutting edges 33 as a result of the method employed in forming the helix, the complex motion of the same makes it possible to employ a new principle in dry shaving, wherein the hairs or bristles are cut and sliced simultaneously.

The importance of this, in addition to simplifying manufacture of the shaving implement by omitting the guard, resides in the fact that an ordinary cutter or blade moving only transversely of a bristle, tends to bend the latter over prior to and during the cutting operation with the result that the bristle is not shorn in a perfectly transverse section, but is cut obliquely so that the cut portion of the bristle, instead of being substantially cylindrical in appearance, is elliptical. Thus, while a blade which moves only transversely may have begun its cutting action at a point very close to the base of the bristle, this action may end at a point appreciably farther away from the base, so that the hair is not cut as short as it should be. Such incomplete or oblique cutting is substantially eliminated by the present invention.

The rotative movement of the cutting edges of the helix simultaneously with their translatory movement, effects a slicing action, as well as a direct cut, so that the bristles are shorn evenly across and very close to the skin, as is brought out in the diagrammatic illustration of Fig. 3.

The objects and advantages of the invention with respect to the product thereof, may be realized by other forms of construction without departing from the broad spirit of the invention, and it is a condition of this disclosure that all equivalent arrangements are to be included within the call of the appended claim.

Having thus described my invention, what I claim as new and desire to protect by Letters Patent is:

In a dry-shaving device, a spiral cutter in which the turns of the spiral are placed in such close proximity as to prevent the entry therebetween of skin, but are spaced adequately to permit the entry therebetween of hairs to be shorn, the edge portions of the turns adjoining the outer peripheral surface thereof being sharpened, said helix being mountable for rotation and manipulation relative to the surface being shaved, and outer peripheral surface portions of said helix directly contacting the surface being shaved.

HENRY RUSKIN.